United States Patent
Kabasawa

(10) Patent No.: US 11,144,442 B2
(45) Date of Patent: Oct. 12, 2021

(54) INFORMATION PROCESSING APPARATUS FOR ADDING FUNCTIONAL MODULE IN SERVICE FUNCTION PROVIDED TO USERS AND NON-TRANSITORY COMPUTER READABLE MEDIUM

(71) Applicant: FUJIFILM Business Innovation Corp., Tokyo (JP)

(72) Inventor: Rie Kabasawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/540,068

(22) Filed: Aug. 14, 2019

(65) Prior Publication Data
US 2020/0301823 A1 Sep. 24, 2020

(30) Foreign Application Priority Data
Mar. 18, 2019 (JP) .............................. JP2019-049326

(51) Int. Cl.
*G06F 11/36* (2006.01)
*G06F 8/20* (2018.01)

(52) U.S. Cl.
CPC ............ *G06F 11/3692* (2013.01); *G06F 8/20* (2013.01); *G06F 11/368* (2013.01)

(58) Field of Classification Search
None
See application file for complete search history.

(56) References Cited

U.S. PATENT DOCUMENTS

| | | | |
|---|---|---|---|
| 2010/0192120 A1* | 7/2010 | Raleigh | G06Q 30/0283 717/101 |
| 2012/0062937 A1* | 3/2012 | Kirihara | H04N 1/00517 358/1.15 |
| 2012/0215838 A1* | 8/2012 | Dominick | H04L 43/08 709/203 |
| 2018/0019912 A1* | 1/2018 | Ichimura | B41J 29/00 |
| 2019/0082048 A1* | 3/2019 | Li | H04M 1/72583 |

FOREIGN PATENT DOCUMENTS

JP 2012164232 8/2012

* cited by examiner

*Primary Examiner* — Daxin Wu
(74) *Attorney, Agent, or Firm* — JCIPRNET

(57) ABSTRACT

An information processing apparatus includes a generation unit and a service function addition unit. The generation unit generates use record information indicating a frequency of use of a service function by a user. The service function addition unit adds, in accordance with the frequency of use, a functional module to the service function provided to the user.

5 Claims, 9 Drawing Sheets

FIG. 3

| COMPANY NAME | COMPANY INFORMATION | | | CONTRACT EXPIRATION DATE | CHARGE INFORMATION | AUTHENTICATION INFORMATION | USER INFORMATION | | |
|---|---|---|---|---|---|---|---|---|---|
| | ADDRESS | NAME OF ADMINISTRATOR | ... | | | | USER ID | CONTACT INFORMATION | ... |
| COMPANY A | ... KANAGAWA PREFECTURE | (NAME) | | | | | | | |
| ... | | | | | | | | | |

FIG. 4

| COMPANY NAME | ON-PREMISES PRODUCT | VERSION | CONTRACT EXPIRATION DATE | SUPPORT TARGET | ALERT ISSUANCE |
|---|---|---|---|---|---|
| COMPANY A | SERVICE α | 1.2.5 | 03/31/2019 | SUPPORTED | NOT ISSUED |
| | SERVICE β | 1.1.5 | 09/30/2019 | SUPPORTED | NOT ISSUED |
| | SERVICE γ | 1.0.4 | 12/31/2022 | NOT SUPPORTED | ISSUED |
| COMPANY B | SERVICE α | 1.2.6 | 12/31/2020 | NOT SUPPORTED | NOT ISSUED |
| ... | | | | | |

FIG. 5

SERVICE α

| FUNCTION NAME | COMPANY A | COMPANY B | COMPANY C |
|---|---|---|---|
| FUNCTION αFA | YES | YES | YES |
| FUNCTION αFB | NO | YES | NO |
| FUNCTION αFC | YES | YES | NO |
| ... | | | |

SERVICE β

| FUNCTION NAME | COMPANY A | COMPANY B | COMPANY C | ... |
|---|---|---|---|---|
| | | | | |

SERVICE γ

| FUNCTION NAME | COMPANY A | COMPANY B | COMPANY C | ... |
|---|---|---|---|---|
| | | | | |

YES: FUNCTION INCLUDED IN SERVICE (ON-PREMISES PRODUCT)
NO: FUNCTION NOT INCLUDED IN SERVICE (ON-PREMISES PRODUCT)

FIG. 7

| DATE AND TIME | CUSTOMER | SERVICE NAME | FUNCTION NAME | SUB-FUNCTION NAME | USER ID | START DATE AND TIME | END DATE AND TIME | TOTAL TIME |
|---|---|---|---|---|---|---|---|---|
| 03/01/2019 10:22:33 | COMPANY A | SERVICE α | SHARING | REGISTRATION | U1029 | 03/01/2019 10:22:00 | 03/01/2019 10:25:30 | 210s |
| . . . | | | | | | | | |

FIG. 8

| FUNCTION NAME | COMPANY NAME | | | | | SUMMATION |
|---|---|---|---|---|---|---|
| | COMPANY A | COMPANY B | COMPANY C | COMPANY D | ... | |
| FUNCTION FA | HIGH | HIGH | HIGH | HIGH | | HIGH |
| FUNCTION FB | MEDIUM | LOW | HIGH | HIGH | | MEDIUM |
| FUNCTION FC | LOW | MEDIUM | — | MEDIUM | | LOW |
| FUNCTION FD | MEDIUM | HIGH | LOW | — | | HIGH |
| FUNCTION FE | LOW | LOW | HIGH | LOW | | MEDIUM |
| ⋮ | | | | | | |

FIG. 9

| FUNCTION NAME | ADDITION TARGET | COST | COST-EFFECTIVENESS |
|---|---|---|---|
| FUNCTION FA | YES | MEDIUM | HIGH |
| FUNCTION FB | YES | HIGH | MEDIUM |
| FUNCTION FC | NO | HIGH | HIGH |
| FUNCTION FD | YES AND NO | LOW | HIGH |
| FUNCTION FE | NO | LOW | MEDIUM |
| ⋮ | | | |

FIG. 10

| ADDITION TARGET | COST | COST-EFFECTIVENESS | FREQUENCY OF USE (SUMMATION) | FUNCTION ADDITION FINAL DETERMINATION |
|---|---|---|---|---|
| YES | HIGH | HIGH | HIGH | TARGET |
| YES | HIGH | MEDIUM | HIGH | TARGET |
| YES | HIGH | LOW | HIGH | NON-TARGET |
| YES | MEDIUM | HIGH | HIGH | TARGET |
| YES | MEDIUM | MEDIUM | HIGH | TARGET |
| YES | MEDIUM | LOW | HIGH | NON-TARGET |
| YES | LOW | HIGH | HIGH | TARGET |
| YES | LOW | MEDIUM | HIGH | TARGET |
| YES | LOW | LOW | HIGH | NON-TARGET |
| ... | ... | ... | ... | ... |
| NO | HIGH | HIGH | MEDIUM | NON-TARGET |
| NO | HIGH | MEDIUM | MEDIUM | NON-TARGET |
| NO | HIGH | LOW | MEDIUM | NON-TARGET |
| NO | MEDIUM | HIGH | MEDIUM | TARGET |
| NO | MEDIUM | MEDIUM | MEDIUM | TARGET |
| NO | MEDIUM | LOW | MEDIUM | NON-TARGET |
| NO | LOW | HIGH | MEDIUM | TARGET |
| NO | LOW | MEDIUM | MEDIUM | TARGET |
| NO | LOW | LOW | MEDIUM | NON-TARGET |

INFORMATION PROCESSING APPARATUS FOR ADDING FUNCTIONAL MODULE IN SERVICE FUNCTION PROVIDED TO USERS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-049326 filed Mar. 18, 2019.

BACKGROUND

(i) Technical Field

The present disclosure relates to an information processing apparatus and a non-transitory computer readable medium.

(ii) Related Art

Japanese Unexamined Patent Application Publication No. 2012-164232 proposes a technique in which character strings are extracted from text deliverables, such as a function design document, a requirement definition document, and so on, any character strings having a probability of presence higher than a threshold are extracted as functions composing requirements, which are the specifications of a system or software, and a traceability matrix in which the functions of the software and the requirements are associated with each other is automatically generated to make changing of a software function convenient. A software developer refers to the traceability matrix to identify a target function to be changed.

SUMMARY

When a traceability matrix is generated from character strings included in text deliverables, such as a function design document, a requirement definition document, and so on, and a software developer refers to the traceability matrix to attempt to extract functions composing a requirement, in a case where character strings with which the functions are identified are not included in the text deliverables, the software developer may fail to precisely extract all functions that compose a service.

Aspects of non-limiting embodiments of the present disclosure relate to enabling addition of a functional module not included in a service function provided to users to the service function unlike in a case where a target function to be changed is identified with reference to a traceability matrix.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a generation unit and a service function addition unit. The generation unit generates use record information indicating a frequency of use of a service function by a user. The service function addition unit adds, in accordance with the frequency of use, a functional module to the service function provided to the user.

BRIEF DESCRIPTION OF THE DRAWINGS

An exemplary embodiment of the present disclosure will be described in detail based on the following figures, wherein:

FIG. 3 is a diagram illustrating an example data structure of contract information included in customer information in the present exemplary embodiment;

FIG. 4 is a diagram illustrating an example data structure of version management information included in customer information in the present exemplary embodiment;

FIG. 5 is a diagram illustrating an example data structure of on-premises product information included in customer information in the present exemplary embodiment;

FIG. 7 is a diagram illustrating an example data structure of history information accumulated in a history information storage unit in the present exemplary embodiment;

FIG. 8 is a diagram illustrating an example data structure of usage information in the present exemplary embodiment;

FIG. 9 is a diagram illustrating an example data structure of providing-side setting information stored in a providing-side setting information storage unit in the present exemplary embodiment; and FIG. 10 is a diagram illustrating an example data structure of addition function selection information stored in an addition function selection information storage unit in the present exemplary embodiment.

DETAILED DESCRIPTION

Hereinafter, an exemplary embodiment of the present disclosure is described with reference to the drawings.

Figure 1:
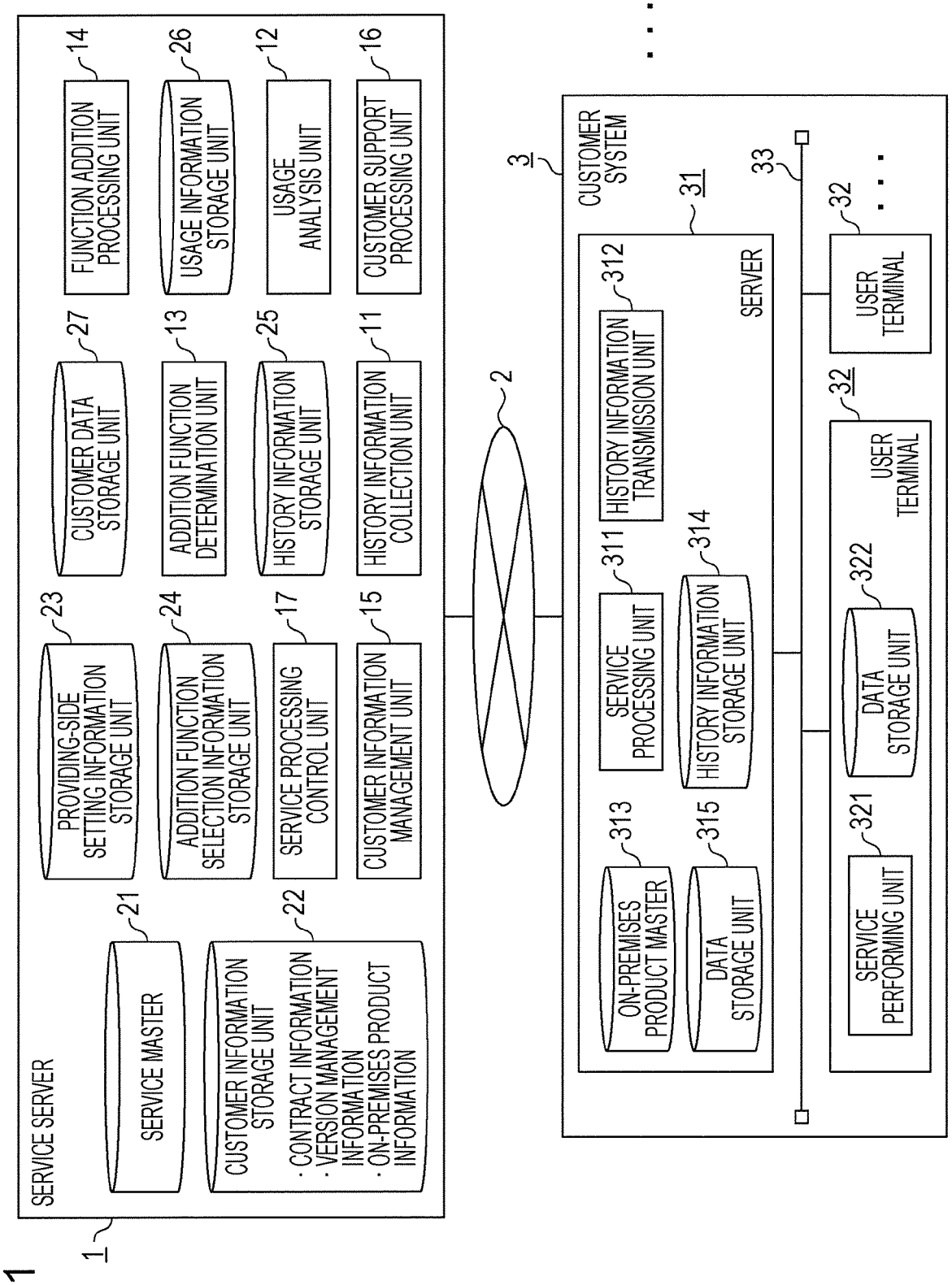
FIG. 1 is a diagram illustrating an overall configuration of a service system in the present exemplary embodiment.

FIG. 1 is a diagram illustrating an overall configuration of a service system in the present exemplary embodiment. FIG. 1 illustrates a configuration in which a service server 1 of a service provider providing services to customers and a customer system 3 of a company that is a customer of the service provider and uses the services provided by the service provider are connected to each other via a network 2, which is, for example, the Internet. A plurality of companies that are customers of the service provider are present, and therefore, a plurality of customer systems 3 are connected to the network 2. However, each of the customer systems 3 similarly has processing functions described below, and therefore, FIG. 1 illustrates only one customer system 3. A company in the present exemplary embodiment is assumed to be a customer of the service provider, and therefore, "company" and "customer" are synonymous in the present exemplary embodiment.

From the viewpoint of the service provider, each customer is a user, and in each company, each individual, such as an employee, using services is a user of the services. In the present exemplary embodiment, a user who uses the services from the viewpoint of the service provider is called "customer", and each individual, such as an employee, who uses the services in each customer (that is, each company) is called "user".

The service server 1 is formed of a server computer having a general-purpose hardware configuration. That is, the service server 1 includes a central processing unit (CPU), a storage means, such as a read-only memory (ROM), a random access memory (RAM), or a hard disk drive (HDD), and a network interface, which is a communication means. In order to, for example, update master data described below, the service server 1 may be provided with a mouse or a keyboard, which is an input means, and a display, which is a display means. The service provider may provide the services that are provided using the service server 1 as cloud services that are provided by cloud computing formed of a plurality of server computers.

The service server 1 includes a history information collection unit 11, a usage analysis unit 12, an addition function determination unit 13, a function addition processing unit 14, a customer information management unit 15, a customer support processing unit 16, a service processing control unit 17, a service master 21, a customer information storage unit 22, a providing-side setting information storage unit 23, an addition function selection information storage unit 24, a history information storage unit 25, a usage information storage unit 26, and a customer data storage unit 27. In the service server 1, a constituent element that is not used in the description of the present exemplary embodiment is omitted from FIG. 1.

First, a structure of the services provided by the service server 1 in the present exemplary embodiment is described with reference to FIG. 2.

Figure 2:
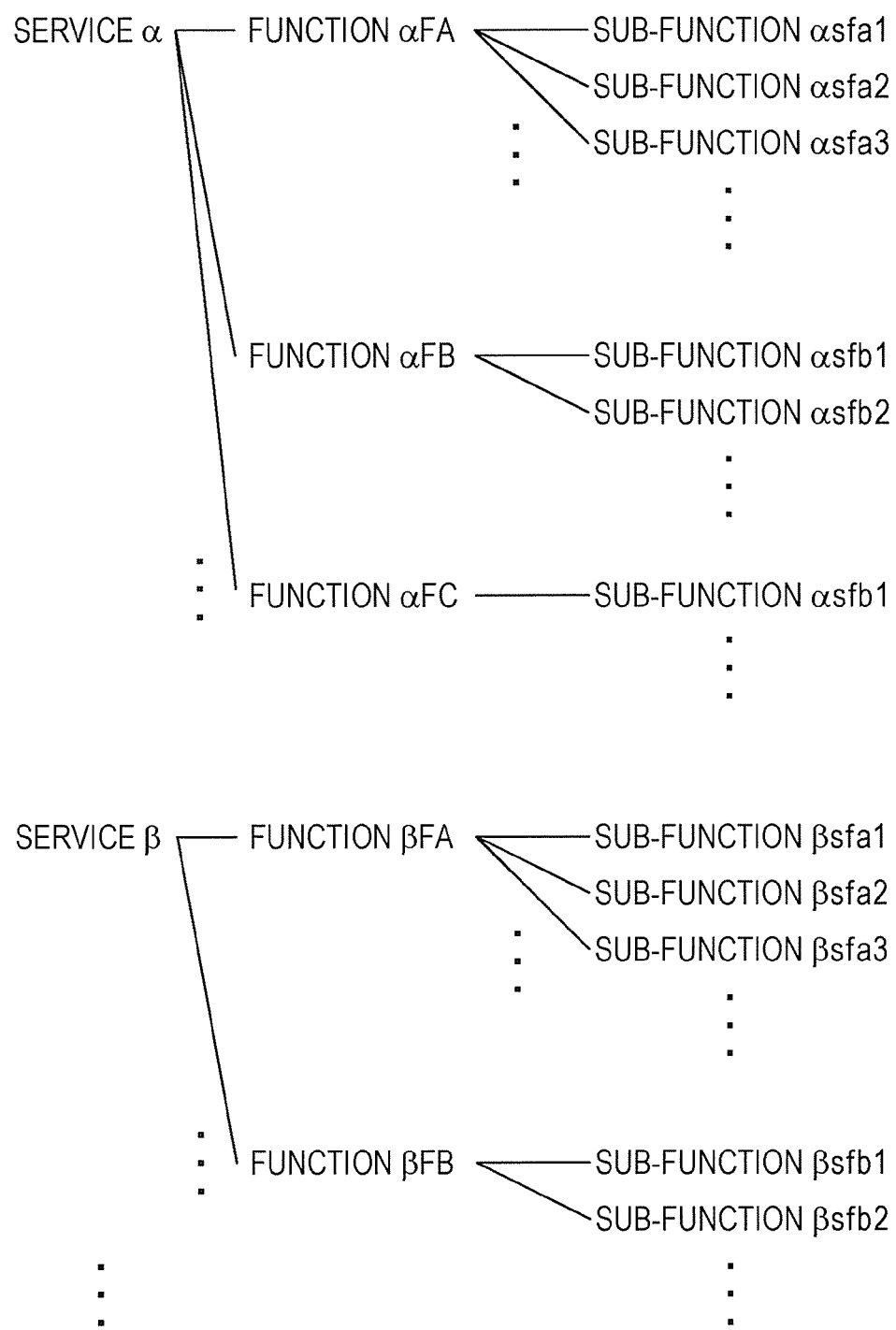
FIG. 2 is a diagram illustrating a structure of services provided by a service server in the present exemplary embodiment.

FIG. 2 is a diagram illustrating a structure of the services managed by using the service master 21 in the present exemplary embodiment. Each service handled in the present exemplary embodiment is configured by incorporating one or more functions as illustrated in FIG. 2. There is a case where one function is incorporated into different services. A function is configured by incorporating one or more sub-functions. For example, a document creation service includes various functions, such as editing, saving, backup, and so on of a document. For example, the backup function includes various sub-functions, such as backup at the time of saving in which a pre-update document is retained without being overwritten at the time of saving the document, automatic backup in which a document that is being edited is temporarily saved, and so on.

In the present exemplary embodiment, each customer uses one or more services provided by the service provider in accordance with a contract made with the service provider. The configuration of functions included in a service provided to each customer in accordance with the contract may differ depending on the customer and is determined in accordance with the content of the contract. That is, even if each customer receives the same service from the service provider, the functional configuration of the service may differ depending on the customer. The configuration of sub-functions included in a function is the same for all customers.

A feature of the present exemplary embodiment is that, in a case where a sub-function that may be added to functions is, for example, developed and is made available, the sub-function is not unconditionally added to the functions, a function to be set as an addition target to which the sub-function is added is selectively determined on the basis of the frequencies of use of services by users of the customers and various conditions, and the sub-function is added to the function that is provided to a customer without asking the customer whether to add the sub-function.

Referring back to FIG. 1, each constituent element included in the service server 1 is described. The history information collection unit 11 collects history information from each customer system 3 and saves the history information in the history information storage unit 25. The usage analysis unit 12 functions as a generation unit, generates usage information by analyzing the history information saved in the history information storage unit 25, and registers the usage information in the usage information storage unit 26. The usage information is use record information indicating the frequencies of use of functions by each customer using services. The addition function determination unit 13 determines, in accordance with the frequency of use of each function by each customer, whether to add a sub-function to functions provided to customers, the frequency of use being included in the usage information. The function addition processing unit 14 functions as a service function addition unit and adds a sub-function to a function to which the addition function determination unit 13 decides to add the sub-function. The function addition processing unit 14 updates the service master 21 concerning the data structure of the function.

The customer information management unit 15 performs information management including maintenance of various type of information saved in the customer information storage unit 22. The customer support processing unit 16 performs processes for supporting customers. The processes include security management for information of each customer, the information being present in the service server 1, and version management for services provided to customers. The service processing control unit 17 controls processes concerning services and, for example, controls performing of services provided by the service provider.

In the service master 21, software for implementing each service is saved in addition to the service structure described above. In the present exemplary embodiment, a function is composed of one sub-function or a combination of a plurality of sub-functions, and a service is composed of one function or a combination of a plurality of functions. Therefore, a function and a service are implemented by incorporating software of sub-functions. In the following description, a sub-function or software of a sub-function is also called "functional module".

In the customer information storage unit 22, contract information, version management information, and on-premises product information are saved as information concerning customers.

FIG. 3 is a diagram illustrating an example data structure of the contract information included in customer information in the present exemplary embodiment. The contract information includes information concerning contracts with customers. FIG. 3 illustrates an example of the contract information that includes a company name, which is information for identifying a customer, company information including the address of the customer, the name of the administrator, and so on, the contract expiration date, charge information concerning charging to the customer, authentication information of the customer, and user information including user IDs of users of the customer who use services provided by the service server 1, contact information, and so on.

FIG. 4 is a diagram illustrating an example data structure of the version management information included in the customer information in the present exemplary embodiment. As the version management information, example version management information that includes a company name, which is information for identifying a customer, information about on-premises products indicating services provided to the customer, the version of each on-premises product provided to the customer, the contract expiration date, an item of "support target" indicating whether support is provided or not, and an item of "alert issuance".

Here, "on-premises" is defined as, for example, installing an information system including a server, software, etc. on the premises of a facility managed by a user who uses the information system and operating the information system. In the present exemplary embodiment, among services provided by the service provider, that is, services managed with the service master 21, a service purchased by a customer in accordance with a contract is called "on-premises product".

FIG. 5 is a diagram illustrating an example data structure of the on-premises product information included in the customer information in the present exemplary embodiment. As described above, the structure of services provided to each customer in accordance with a contract differs depending on the customer, and functions that compose a service provided to each customer may differ depending on the customer. FIG. 5 illustrates functions included in each service for which each customer has made a contract among the functions that compose the service. FIG. 5 illustrates a state where, for example, the function αFB of the service α is included in an on-premises product of company B but is not included in an on-premises product of company A or that of company C. In a case where the service α includes none of the functions for a company, that is, for example, regarding a company for which all fields are marked "no" in FIG. 5, the service α is a service that does not correspond to an on-premises product for the company.

A description of the other information stored in the storage units 23 to 27 will be given together with a description of operations.

The constituent elements 11 to 17 of the service server 1 are implemented by a cooperative operation of a computer that constitutes the service server 1 and a program run by a CPU mounted in the computer. The storage units 21 to 27 are implemented as an HDD mounted in the service server 1. Alternatively, a RAM or an external storage means may be used via a network.

The customer system 3 is an intra-company system configured by connecting a server 31 and a plurality of user terminals 32 via a local area network (LAN) 33, the user terminals 32 being used by employees, etc. (that is, "users") who use services. Each user terminal 32 may be implemented with a general-purpose hardware configuration of, for example, a personal computer (PC) that is readily available. Each user terminal 32 includes a service performing unit 321 that operates when a service is used and a data storage unit 322 that stores data (for example, document data) generated as a result of using a service. Each user terminal 32 includes the same constituent elements, and therefore, the constituent elements are illustrated for only one user terminal 32 in FIG. 1. The service performing unit 321 is implemented by a cooperative operation of a computer that constitutes the user terminal 32 and a program run by a CPU mounted in the computer. The data storage unit 322 is implemented as an HDD mounted in the user terminal 32. Alternatively, a RAM or an external storage means may be used via a network.

The server 31 is an information processing apparatus that is provided to implement on-premises in the customer system 3, is formed of a server computer having a general-purpose hardware configuration, and includes constituent elements necessary for using services provided by the service provider. That is, the server 31 includes a service processing unit 311, a history information transmission unit 312, an on-premises product master 313, a history information storage unit 314, and a data storage unit 315. The service processing unit 311 operates cooperatively with the service performing unit 321 in response to a request from a user for using a service and performs a process for the service, which is an on-premises product. After performing the process for the service, the service processing unit 311 generates history information about the service and registers the history information in the history information storage unit 314. The history information transmission unit 312 transmits the history information saved in the history information storage unit 314 to the service server 1.

The service provider provides services based on a contract to a customer. In the on-premises product master 313, information about a service for which the customer receives a license form the service provider, that information about the on-premises product, is registered. Specifically, a service that corresponds to an on-premises product and functional modules that compose the service are registered.

In the history information storage unit 314, history information including use records that indicate use of services by users is accumulated. In the data storage unit 315, data (for example, document data) generated as a result of using an on-premises product by a user is saved.

The constituent elements 311 and 312 of the server 31 are implemented by a cooperative operation of a computer that constitutes the server 31 and a program run by a CPU mounted in the computer. The storage units 313 to 315 are implemented as an HDD mounted in the server 31. Alternatively, a RAM or an external storage means may be used via a network.

The programs used in the present exemplary embodiment may be, as a matter of course, provided via a communication means or may be stored in a computer-readable recording medium, such as a compact disc read-only memory (CD-ROM) or a universal serial bus (USB) memory, and provided. The programs provided via a communication means or a recording medium are installed on the respective computers, and the CPUs of the respective computers execute the programs sequentially to implement various processes.

Next, operations of the service system in the present exemplary embodiment are described.

A user who uses the customer system 3 operates the user terminal 32 to use services registered in the on-premises product master 313. The user may be allowed to use a service that is not an on-premises product; however, the present exemplary embodiment assumes that the user uses only on-premises products. The service processing unit 311 cooperates with the service performing unit 321 to perform a service specified in a user operation. For example, in a case of a document creation service, the service processing unit 311 performs a document creation service process to create a document. The created document is saved in the data storage unit 322 or the data storage unit 315. Alternatively, the created document may be saved in the customer data storage unit 27 of the service server 1. When the created document is saved in the customer data storage unit 27, the created document is encrypted and saved. The document saving and encryption are performed by the customer support processing unit 16.

After performing the service process, the service processing unit 311 generates history information about the service and registers the history information in the history information storage unit 314. When the history information is registered in the history information storage unit 314, the history information transmission unit 312 transmits the history information to the service server 1. History information transmission may be performed each time history information is registered in the history information storage unit 314, or pieces of history information that are not yet transmitted may be collectively transmitted at predetermined time intervals.

Figure 6:
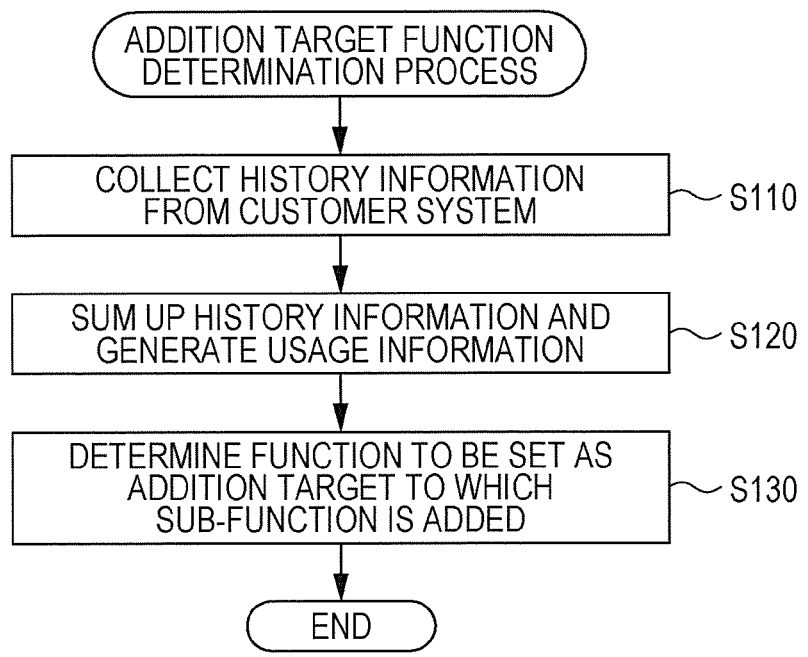
FIG. 6 is a flowchart illustrating a process for determining a function to be set as an addition target to which a sub-function is added in the present exemplary embodiment.

The service server 1 determines, on the basis of pieces of history information collected from the customer system 3, a function to which a sub-function (that is, a functional module) is added. This process is described with reference to the flowchart illustrated in FIG. 6.

First, in step S110, the history information collection unit 11 of the service server 1 collects history information transmitted from each customer system 3 and saves the history information in the history information storage unit 25.

FIG. 7 is a diagram illustrating an example data structure of history information accumulated in the history information storage unit 25 in the present exemplary embodiment. The history information includes a date and time, information about a customer, a service name, a function name, a sub-function name, a user ID, a start date and time, an end date and time, and a total time. The date and time is the date and time when the history information is registered in the history information storage unit 25. The information about a customer is the company name of a customer that transmits the history information. The service name is the name of a performed service, the function name is the name of an executed function, and the sub-function name is the name of an executed sub-function. The user ID is the user ID of a user who uses the service. The start date and time is the date and time when the use of the service starts, the end date and time is the date and time when the use of the service ends, and the total time is the use time of the service and is obtained from the difference between the end date and time and the start date and time.

The history information collection unit 11 adds, to history information collected from the customer system 3, identification information of a customer (that is, the company name) from which the history information is collected, and saves the history information in the history information storage unit 25. The history information collection unit 11 may receive and save, in the history information storage unit 25, history information autonomously transmitted from each customer system 3, or the history information collection unit 11 may instruct the customer system 3 to transmit history information to collect the history information.

In step S120, the usage analysis unit 12 refers to pieces of history information saved in the history information storage unit 25 and falling within a predetermined period, sums up the use times of each function within the predetermined period for each customer, generates usage information for each customer on the basis of the result of summation, and saves the usage information in the usage information storage unit 26.

In the present exemplary embodiment, the history information collection unit 11 adds, to history information collected from the customer system 3, identification information of the customer; however, the history information collection unit 11 may save the received history information as is without adding the identification information. In this case, the use times of each function by each user may be summed up, and the use times of each function by respective users may be summed up for each customer by referring to the contract information in the customer information to generate usage information.

FIG. 8 is a diagram illustrating an example data structure of the usage information generated by the usage analysis unit 12. As illustrated in FIG. 8, the usage of each function for each customer is indicated. In FIG. 8, the usage of a function by each customer is compared with predetermined two thresholds and classified as one of the three levels indicating that the use time of the function is long, medium, and short, which are respectively represented by "high", "medium", and "low" in FIG. 8. Note that "-" indicates that the function is not used by the customer.

The usage analysis unit 12 further sums up the usage by the respective customers for each function to obtain the usage of the function. The results of summation for the respective functions are set in the rightmost column "summation" in the usage information illustrated in FIG. 8.

In the present exemplary embodiment, the level of usage of each function by each customer is classified as one of the three levels; however, the level may be classified as one of at least two levels.

Subsequently, in step S130, the addition function determination unit 13 determines a function to which a sub-function is added. In the present exemplary embodiment, some determination patterns are provided, and a desired pattern among the patterns is employed.

With reference to the usage information illustrated in FIG. 8, the use time of each function is evaluated for each customer, and a function for which the use time is equal to or longer than a predetermined threshold and evaluated to be long (a function marked "high" in FIG. 8) is determined to be an addition target to which a sub-function is added. Accordingly, the sub-function is provided to the customer in which the use time of the function is long. In the present exemplary embodiment, the usage of each function is classified as one of the three levels. A function used by a customer in which the use time of the function is medium (a customer marked "medium" for the function) in addition to a customer in which the use time of the function is long may be evaluated to be a function for which the use time is equal to or longer than a predetermined threshold and may be set as an addition target to which the sub-function is added.

In the above-described pattern, a function to be set as an addition target is determined for each function and for each customer; however, customers need not be differentiated from each other. For example, determination may be made for each function. Specifically, if a function is present for which the use time is long for any of the customers (a function marked "high" in FIG. 8), the function is set as an addition target to which a sub-function is added for all customers. In the example illustrated in FIG. 8, the functions FA, FB, FD, and FE that correspond to functions for which the use time is long (functions marked "high" in FIG. 8) are set as addition targets to which a sub-function is added. Alternatively, the summation in the rightmost column in the usage information may be referred to, and a function to be set as an addition target to which a sub-function is added may be selected.

Contrary to the above, for example, the frequency of use of the function FE is high in company C and the function FE may be selected as an addition target to which a sub-function is added; however, the frequencies of use in the other companies are low, and the frequency of use is medium as a whole (that is, the summation is marked "medium"). Accordingly, the function FE need not be selected as an addition target to which a sub-function is added.

In the above-described pattern, a function to be set as an addition target to which a sub-function is added (hereinafter also referred to as "addition target function") is determined on the basis of only the usage of the function by customers. A description is given below of a pattern in which the addition function determination unit 13 determines an addition target function by taking into consideration the service provider's intention.

FIG. 9 is a diagram illustrating an example data structure of providing-side setting information stored in the providing-side setting information storage unit 23 in the present exemplary embodiment. The providing-side setting information and addition function selection information described below correspond to determination condition information in which the service provider sets their intention concerning functions to be set as addition targets to which a sub-function is added and in which determination conditions for determining whether to add a sub-function to functions are set. The addition function determination unit 13 obtains the providing-side setting information and the addition function selection information from the respective storage units 23 and 24 and determines an addition target function.

In the providing-side setting information, three indexes of "addition target", "cost", and "cost-effectiveness" are set for each function. As "addition target", whether to set the function as an addition target to which a sub-function is added is set. The item value of "yes" indicates that the function is to be set as an addition target, and the item value of "no" indicates that the function is not to be set as an addition target. The item value of "yes and no" indicates that the function may be included as a function to be set as an addition target or may be included as a function not to be set as an addition target. A function marked "yes and no" may be dependent on determination based on the other indexes. As "cost", the level of cost incurred in adding a sub-function to the function is set. In the present exemplary embodiment, the level is classified as one of the three levels and set; however, at least two levels need to be provided. As "cost-effectiveness", the level of an expected effect for an expense (that is, cost) incurred in adding a sub-function is set. In the present exemplary embodiment, the level is classified as one of the three levels and set; however, at least two levels need to be provided.

According to the setting example illustrated in FIG. 9, the function FC and the function FE are not selected as addition targets to which a sub-function is added. The items of "cost" and "cost-effectiveness" are referred to when the addition function selection information described next is used.

FIG. 10 is a diagram illustrating an example data structure of the addition function selection information stored in the addition function selection information storage unit 24 in the present exemplary embodiment. In the addition function selection information, items of "addition target", "cost", "cost-effectiveness", "frequency of use (summation)", and "function addition final determination" are set. Among these items, "addition target", "cost", and "cost-effectiveness" are items corresponding to those in the providing-side setting information illustrated in FIG. 9. The item of "frequency of use (summation)" is an item corresponding to the item of "summation" in the rightmost column in the usage information illustrated in FIG. 8. As "function addition final determination", final determination as to whether the service provider sets the function (the function is determined on the basis of a combination of "addition target", "cost", "cost-effectiveness", and "frequency of use (summation)") as an addition target to which a sub-function is added is set, where "target" means that the function is to be set as an addition target and "non-target" means that the function is not to be set as an addition target.

In a case of selecting an addition target function to which a sub-function is added by taking into consideration the service provider's intention, in this pattern, an addition target function is selected by referring to the addition function selection information. If the service provider determines in advance a desired function to be an addition target function, the users' usage need not be referred to. On the other hand, if an addition target function is determined by referring to the users' usage, it is not possible to reflect the service provider's intention in selection of an addition target function. In the present exemplary embodiment, the addition function selection information is used to match the service provider's intention and the users' usage to enable final selection of an addition target function to be made.

For example, according to the setting example of the providing-side setting information illustrated in FIG. 9, the item value of the function FE is marked "no" and is set as a non-addition target. The cost and the cost-effectiveness are respectively marked "low" and "medium". According to the setting example of "summation" in the usage information illustrated in FIG. 8, the frequency of use of the function FE is "medium", that is, it is found that the function FE is used by customers to a medium degree.

Here, the items values of "addition target", "cost", "cost-effectiveness", and "frequency of use (summation)" of the function FE are "no", "low", "medium", and "medium" respectively, and therefore, the function FE corresponds to the record 41 according to the setting example of the addition function selection information illustrated in FIG. 10. The function addition final determination in the record 41 indicates "target". That is, there is a case where, even when a function, such as the function FE, is set as a non-addition target in the providing-side setting information, if the function satisfies a determination condition formed of a combination of the item values in the addition function selection information, the function is finally selected as an addition target function.

According to the setting example of the providing-side setting information illustrated in FIG. 9, the service provider considers that the function FE need not be set as an addition target to which a sub-function is added. However, the function FE is used to a medium degree, the cost of adding a sub-function to the function FE is low, and cost-effectiveness is expected to some extent. Therefore, it is finally determined that a sub-function may be added to the function FE by taking into consideration the aspects of the users' usage and the circumstances of the service provider as a whole.

Contrary to the case of the function FE, with reference to the addition function selection information, there is a case where, regarding a function for which a cost incurred in adding a sub-function is high and cost-effectiveness is hardly expected, namely, a function corresponding to, for example, the record 42, even if the frequency of use is high and the function is set as a candidate addition target function in accordance with the providing-side setting information, the function is finally determined to be a non-addition target.

As described above, in step S130, the addition function determination unit 13 determines a function to which a sub-function is added by using any of the above-described patterns.

When the addition function determination unit 13 determines a function to which a sub-function is added as described above, the function addition processing unit 14 adds the sub-function to the function to which the addition function determination unit 13 decides to add the sub-function, and updates the service master 21 concerning the corresponding data structure of the function. It is assumed that, in a case where a plurality of sub-functions that are to be added to one addition target function are present, all sub-functions that may be added are added to the addition target function without determining whether each of the sub-functions is to be added. Regarding a sub-function to be added, information about the usage is not available, and therefore, sub-functions need not be differentiated from each other.

The service provider in the present exemplary embodiment provides additional functions concerning security and version management to customers.

First, regarding security, a user may save data, such as a document, created by using a service in the customer data storage unit 27 of the service server 1. The customer data storage unit 27 is shared by users of a plurality of customers, and therefore, a security issue may arise. The customer support processing unit 16 provides a function of, for example, prohibiting a customer from accessing data of the other customers saved in the customer data storage unit 27. Alternatively, the customer support processing unit 16 allows only a user of a company having a predetermined privilege among the users of the same company to access data of the company.

Regarding version management, the customer support processing unit 16 refers to the version management information included in the customer information to perform version management for the on-premises products.

For example, the customer support processing unit 16 refers to the version management information illustrated in FIG. 4 and provides support at the time of version-up to a support target customer. In a case where a version in use expires in a short time (for example, one month before the contract expiration date), the customer support processing unit 16 sends a version-up notice to a customer that is an alert issuance target.

As described above, the present exemplary embodiment enables a sub-function to be added to a function regardless of a request from a user. When a function to be set as an addition target is identified, unlike in the related art, a traceability matrix need not be created.

In the present exemplary embodiment, the description has been given under the assumption that a sub-function is a functional module and a function is a service function to be set as an addition target to which a sub-function is added. This relationship between a functional module and a service function is not limited to the relationship between a sub-function and a function and is applicable also to the relationship between a function and a service. That is, it may be assumed that a function is a functional module and a service is a service function to be set as an addition target to which a function is added.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising a hardware processor configured to:
    generate use record information indicating a frequency of use of a service function by each of a plurality users;
    determine whether the frequency of use of the service function by a user among the plurality of users is equal to or higher than a predetermined threshold;
    determine whether a frequency of use of the service function by an other user among the plurality of users satisfies a predetermined addition condition, wherein the predetermined addition condition is related to a level of cost incurred in adding the functional module to the service function; and
    add, in accordance with the frequency of use, a functional module to the service function provided to the user,
    wherein in response to determining that the frequency of use of the service function by the user is equal to or higher than a predetermined threshold and the frequency of use of the service function by the other user among the plurality of users satisfies the predetermined addition condition, the hardware processor adds the functional module to the service function provided to the user,
    in response to determining that the frequency of use of the service function by the user among the plurality of users is equal to or higher than the predetermined threshold and the frequency of use of the service function by the other user among the plurality of users does not satisfy the predetermined addition condition, the hardware processor does not add the functional module to the service function provided to the user.

2. The information processing apparatus according to claim 1, wherein the hardware processor is further configured to
    obtain determination condition information set by a service function provider, the determination condition information including a determination condition for determining whether to add the functional module to the service function, wherein
    in a case where the determination condition information and the use record information satisfy the determination condition, the hardware processor adds the functional module to the service function provided to the user.

3. The information processing apparatus according to claim 2, wherein in the determination condition information, the determination condition that relates to a cost incurred in adding the functional module to the service function is set.

4. A non-transitory computer readable medium storing a program causing a computer to execute a process for information processing, the process comprising:
    generating use record information indicating a frequency of use of a service function by each of a plurality users;
    determining whether the frequency of use of the service function by a user among the plurality of users is equal to or higher than a predetermined threshold;
    determining whether a frequency of use of the service function by an other user among the plurality of users satisfies a predetermined addition condition, wherein the predetermined addition condition is related to a level of cost incurred in adding the functional module to the service function;

adding, in accordance with the frequency of use, a functional module to the service function provided to the user, and wherein in response to determining that the frequency of use of the service function by the user is equal to or higher than a predetermined threshold and the frequency of use of the service function by the other user among the plurality of users satisfies the predetermined addition condition, the hardware processor adds the functional module to the service function provided to the user, in response to determining that frequency of use of the service function by user among the plurality of users is equal to or higher than the predetermined threshold and the frequency of use of the service function by the plurality of users does not satisfy the predetermined addition condition, the hardware processor does not add the functional module to the service function provided to the user.

5. An information processing method comprising:

generating use record information indicating a frequency of use of a service function by each of a plurality users;

determining whether the frequency of use of the service function by a user among the plurality of users is equal to or higher than a predetermined threshold;

determining whether a frequency of use of the service function by an other user among the plurality of users satisfies a predetermined addition condition, wherein the predetermined addition condition is related to a level of cost incurred in adding the functional module to the service function; and adding, in accordance with the frequency of use, a functional module to the service function provided to the user, wherein in response to determining that the frequency of use of the service function by the user is equal to or higher than a predetermined threshold and the frequency of use of the service function by the other user among the plurality of users satisfies the predetermined addition condition, the hardware processor adds the functional module to the service function provided to the user, in response to determining that the frequency of use of the service function by user among the plurality of users is equal to or higher than the predetermined threshold and the frequency of use of the service function by the plurality of users does not satisfy the predetermined addition condition, the hardware processor does not add the functional module to the service function provided to the user.

\* \* \* \* \*